US012625804B2

(12) United States Patent
Liu et al.

(10) Patent No.: US 12,625,804 B2
(45) Date of Patent: May 12, 2026

(54) FLEXIBLE INFORMATION COMPRESSION AT A MEMORY SYSTEM

(71) Applicant: Micron Technology, Inc., Boise, ID (US)

(72) Inventors: Yanming Liu, Shanghai (CN); Zhenzhen Yang, Shanghai (CN); Yi Heng Sun, Shanghai (CN); Junjun Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/668,019

(22) Filed: May 17, 2024

(65) Prior Publication Data

US 2024/0394197 A1     Nov. 28, 2024

Related U.S. Application Data

(63) Continuation of application No. 17/645,686, filed on Dec. 22, 2021, now Pat. No. 12,013,789.

(51) Int. Cl.
G06F 12/02          (2006.01)

(52) U.S. Cl.
CPC .. G06F 12/0246 (2013.01); G06F 2212/7201 (2013.01)

(58) Field of Classification Search
CPC .................... G06F 12/0246; G06F 2212/7201
See application file for complete search history.

(56) References Cited

U.S. PATENT DOCUMENTS

| | | | |
|---|---|---|---|
| 7,076,605 B1 | 7/2006 | Son | |
| 2014/0289451 A1* | 9/2014 | Ho | G06F 12/0246 |
| | | | 711/103 |
| 2019/0065387 A1* | 2/2019 | Duzly | G06F 12/0246 |
| 2019/0079687 A1 | 3/2019 | Qi et al. | |
| 2019/0155723 A1 | 5/2019 | Park et al. | |
| 2019/0220416 A1* | 7/2019 | Jung | G06F 12/1009 |
| 2019/0278659 A1 | 9/2019 | Balasubramanian et al. | |
| 2019/0369912 A1 | 12/2019 | Steinmetz | |
| 2022/0358051 A1* | 11/2022 | Fu | G06F 12/1054 |

* cited by examiner

*Primary Examiner* — Chie Yew
(74) *Attorney, Agent, or Firm* — Holland & Hart LLP

(57)          ABSTRACT

Methods, systems, and devices for flexible information compression at a memory system are described. For example, a memory system may compress information in a change log to reduce the frequency of transfers of one or more mappings between volatile memory and non-volatile memory. The memory system may compress information associated with a sequence of sequentially-indexed addresses by storing the information associated with those addresses at a pair of entries in the change log. The memory system may additionally switch between a first operating mode associated with identifying sequentially-indexed addresses and generating compressed entries, and a second operating mode associated with generating entries of the change log for each address received in commands.

20 Claims, 5 Drawing Sheets

| | 205-a | 215-a | 225-a | 205-b | 215-b | 225-b |
|---|---|---|---|---|---|---|
| Entry 210 | 0 | LBA 1 | PPA 1 | | | |
| Entry Pair 220 | 1 | LBA 2 | PPA 2 | 1 | LBA 3 | PPA 3 |
| • • • | | • • • | • • • | | • • • | • • • |
| Compressed Entry Pair 230 | 1 | LBA i | PPA i | 1 | LBA i+m | PPA i+m |

200

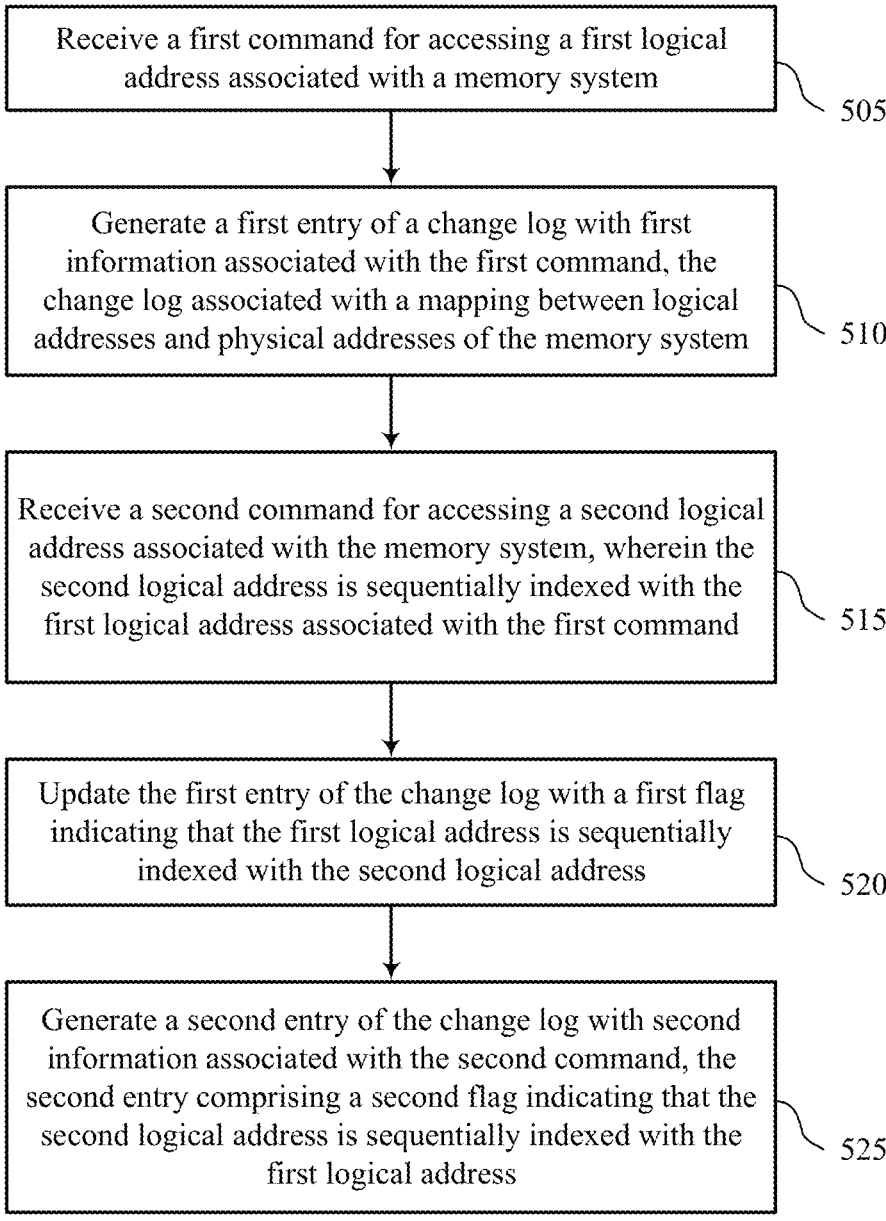

Receive a first command for accessing a first logical address associated with a memory system

505

Generate a first entry of a change log with first information associated with the first command, the change log associated with a mapping between logical addresses and physical addresses of the memory system

510

Receive a second command for accessing a second logical address associated with the memory system, wherein the second logical address is sequentially indexed with the first logical address associated with the first command

515

Update the first entry of the change log with a first flag indicating that the first logical address is sequentially indexed with the second logical address

520

Generate a second entry of the change log with second information associated with the second command, the second entry comprising a second flag indicating that the second logical address is sequentially indexed with the first logical address

FLEXIBLE INFORMATION COMPRESSION AT A MEMORY SYSTEM

CROSS REFERENCE

The present application for patent is a continuation of U.S. patent application Ser. No. 17/645,686 by Liu et al., entitled "FLEXIBLE INFORMATION COMPRESSION AT A MEMORY SYSTEM," filed Dec. 22, 2021, which is assigned to the assignee hereof and is expressly incorporated by reference herein.

FIELD OF TECHNOLOGY

The following relates generally to one or more systems for memory and more specifically to flexible information compression at a memory system.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

BRIEF DESCRIPTION OF THE DRAWINGS

FIG. 5 shows a flowchart illustrating a method or methods that support flexible information compression at a memory system in accordance with examples as disclosed herein.

DETAILED DESCRIPTION

Figure 1:
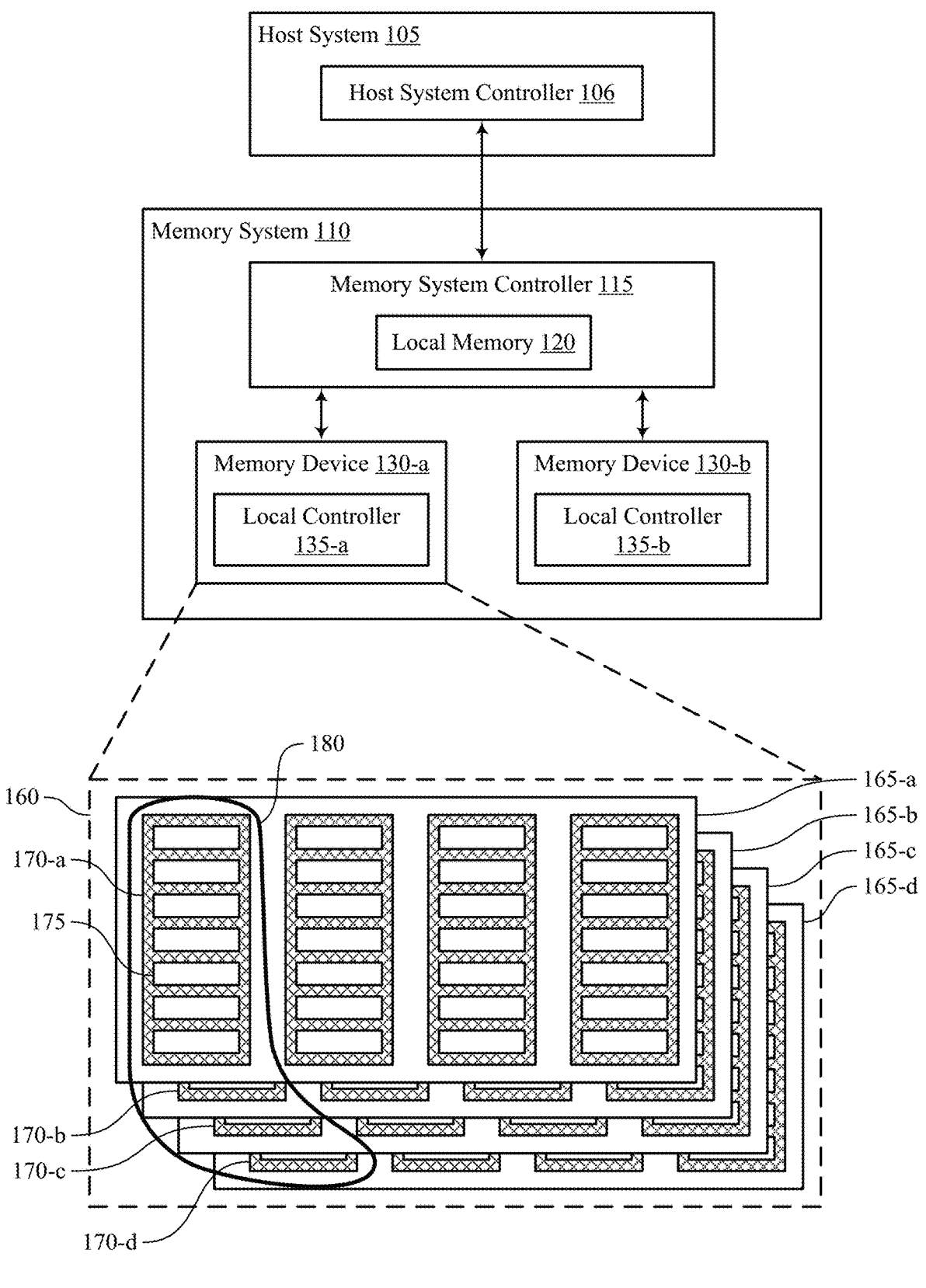
FIG. 1 illustrates an example of a system that supports flexible information compression at a memory system in accordance with examples as disclosed herein.

Memory devices of a memory system may store data at a physical address. For example, the memory system may receive a write command indicating data for the memory system to write in one or more memory devices. In some examples, a host device of the memory system may use a logical address as a reference to access the physical location of memory. For example, the write command may include a logical address (issued by the host system) associated with the data, which may be different than the physical address (issued by the memory system) used for storing the data. In some examples, the physical or logical location of data within a memory device may change over time due to the memory device accommodating the writing of additional data, maintenance operations performed by the memory device, or for other reasons. In some examples, a memory device may include a physical page table (PPT) to manage the mapping between logical addresses and physical addresses. For example, the PPT may be example of a logical-to-physical (L2P) mapping or table. The memory system may also use a page validity table (PVT) to indicate which physical addresses (e.g., pages) are presently storing valid information.

In some examples, the PPT may be stored in non-volatile memory (e.g., NAND) but to update or change the PPT, portions of the PPT may be transferred to a volatile memory. In some cases, a change log may be stored in the volatile memory. The change log may record changes to the PPT (e.g., based on commands) so that changes to the PPT may be grouped and handled more efficiently. For the mapping between logical addresses and physical addresses to stay up to date, the memory device may periodically transfer update information from the temporary storage in volatile memory to the PPT in non-volatile storage (e.g., NAND). For example, if a host device sends a write command, the memory device may allocate a physical address associated with the command and may update the relevant information by transferring the update information to the PPT. In some examples, transferring information to the PPT may be associated with a latency and may impact performance at the memory system. In some examples, to reduce the quantity of updates, the memory system may include a change log in volatile memory, which may record the updates to information in the PPT such that the memory device may transfer the updated information in the change log to the PPT at one time or at grouped intervals. In some examples, there may be a change log associated with the PPT (e.g., a PPT change log) and a change log associated with the PVT (e.g., a PVT change log). However, the size of the change logs may be limited by SRAM size at the memory device, and therefore the memory device may still perform frequent transfers of information between the volatile memory device (e.g., SRAM) and the non-volatile memory device (e.g., NAND).

Accordingly, the techniques as described herein provide a memory system with flexible information compression that may be implemented at the change log. For example, by compressing information at the change log, a memory system may reduce the frequency of transfers between the volatile memory and the non-volatile memory (e.g., NAND memory), thus reducing latency and improving performance at the memory system. In some examples, the memory device may compress information associated with sequentially indexed addresses. For example, if multiple access commands are received that include sequentially indexed addresses, the memory device may store the information associated with those addresses at a pair of entries in the change log (e.g., a sequential entry pair). In some examples, the memory system may switch between two operating modes. For example, a first operating mode may be associated with identifying sequentially-indexed addresses and generating compressed entries, and a second operating mode may be associated with generating entries of the change log for each address received in commands. By selectively switching between the two operating modes and, in some cases, compressing information at the change log, the memory system may reduce the frequency of transfers between the volatile memory and the non-volatile memory (e.g., NAND memory), thus improving performance.

Features of the disclosure are initially described in the context of systems, devices, and circuits with reference to FIG. 1. Features of the disclosure are described in the context of change logs, associated compression schemes, and process flows with reference to FIGS. 2A-3. These and other features of the disclosure are further illustrated by and described in the context of an apparatus diagram and flowchart that relate to flexible information compression at a memory system with reference to FIGS. 4-5.

FIG. 1 illustrates an example of a system 100 that supports flexible information compression at a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof.

Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support flexible information compression at a memory system. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may support flexible information compression that may be implemented at a change log. For example, the local memory 120, or a memory device 130 may be examples of volatile memory where the memory system 110 may have a change log to store updates to a PPT. For example, the PPT may be stored at a second memory device 130, which may be an example of non-volatile memory. In some examples, the PPT may include an L2P mapping to associate logical addresses with physical addresses at the memory system 110 (e.g., the pages 175). In some examples, logical addresses may be associated with commands received from the host system 105. To keep the PPT up-to-date, the memory system 110 may periodically transfer information from the change log to the PPT. In some examples, the memory system 110 may be configured to compress the information associated with a sequence of access commands at a single pair of entries in the change log, thus reducing the number of transfers from volatile to non-volatile memory, and improving performance of the memory system 110.

Figure 2A:
FIG. 2A illustrates an example of a change log that supports flexible information compression at a memory system in accordance with examples as disclosed herein.

FIG. 2A illustrates an example of a change log 200 that supports flexible information compression at a memory system in accordance with examples as disclosed herein. The change log 200 may be an example of aspects of a memory system as described with reference to FIG. 1. The change log 200 may include multiple entries (e.g., the entry 210), some of which may be grouped into entry pairs (e.g., the entry pair 220) or compressed entries (e.g., the compressed entry 230). Entries of the change log 200 may include a flag 205, a logical address 215, and a corresponding physical address 225.

The change log 200 may be an example of physical storage for updated information related to the PPT or PVT, as described herein. The change log 200 may be stored in a portion of volatile memory (e.g., SRAM), and the information in the change log 200 may periodically be transferred into non-volatile memory (e.g., NAND). In some examples, the information within the change log 200 may refer to physical addresses (e.g., sometimes referred to as physical page addresses (PPAs)), which may be examples of dies, planes, and pages as described herein with reference to FIG. 1. In some examples, the information within the change log 200 may also refer to logical addresses (e.g., sometimes referred to as logical block addresses (LBAs)), and each logical address may correspond to a physical address. Thus, the change log 200 may include a mapping between logical and physical addresses associated with commands from a host device.

In some examples, the memory system may receive an access command (e.g., a read or write command, among other examples of commands) to read or write data at an associated LBA. The memory system may write the data to a physical address (e.g., a PPA) and store a correspondence (e.g., a L2P mapping) between the LBA and the PPA in the PPT (or in the change log associated with the PPT, as the case may be). For the memory system to perform access operations without errors, it may be useful for the mapping between LBAs and PPAs to stay updated. However, updating the PPT may be associated with a latency at the memory system, and performing an update after each command may reduce overall efficiency of the memory system. For example, the PPT may be too large to store in the volatile memory (e.g., SRAM). Thus, the PPT may be stored in the non-volatile memory (e.g., NAND) and portions of the PPT may be transferred from the non-volatile memory (e.g., NAND) to the volatile memory (e.g., SRAM), updated based on new information, and transferred back to the non-volatile memory (e.g., NAND) from the volatile memory (e.g., SRAM). Transferring information to and from the non-volatile memory (e.g., NAND) may increase the latency of operations. In some examples, a memory system may use a change log (e.g., the change log 200) to temporarily store updates related to the PPT mapping (e.g., the L2P mapping) in the volatile memory, and may periodically update the PPT. In some examples, a change log entry may consist of a 4-byte LBA, and a 4-byte PPA, and a single bit flag. In some examples, the change log 200 may be associated with a limited size of the SRAM, and thus the memory system may still perform a high number of transfers to keep the PPT up to date.

In some examples, the change log 200 may support flexible information compression, such that the memory system may increase the amount of information stored at a limited portion of the volatile memory (e.g., SRAM) and may decrease the number of transfers to update the PPT. For example, the memory system may compress information associated with sequentially-indexed addresses (e.g., logical addresses, physical addresses or both that may be in adjacent integers to one another). In some examples, information associated with a sequential pair of addresses may be stored as an entry pair in the change log 200 (e.g., the entry pair 220). In some examples, information associated with multiple sequentially indexed addresses may be compressed and stored as a compressed entry of the change log 200 (e.g., the compressed entry 230). In some examples, information associated with a single, non-sequentially indexed address may be stored at a single entry 210 of the change log 200 (e.g., the entry 210).

In some examples, the memory system may switch between a first and second operating mode, based on whether previously-received commands may have been sequentially or non-sequentially indexed. For example, a first operating mode (e.g., a default mode) may be associated with identifying sequentially-indexed addresses and generating compressed entries, such as the compressed entry 230 of the change log 200. In some examples, receiving a threshold amount of commands including non-sequentially-indexed addresses may trigger the memory system to switch to the second operating mode. For example, the second operating mode may be associated with generating entries of the change log 200 for each address received in commands, such as the entry 210. By switching between the two modes, the memory system may generate a change log (e.g., the change log 200) with sections of compressed entries or entry pairs interspersed between sections of non-compressed, single entries. For example, over a first duration, the memory system may be requested to access a sequence of random addresses (e.g., logical or physical) that are not related adjacent to one another. In such examples, it may be more efficient to refrain from checking an address to determine whether it is sequential with a preceding address. In other examples, over a second duration, the memory system may be requested to access a sequence of sequentially-indexed addresses (e.g., logical or physical) that are adjacent to one another. In such examples, it may be more efficient for the memory system to check an address to determine whether it is sequential with a preceding address and then compress entries in the change log.

The different modes may allow the performance of the memory system be adjusted based on how the memory system is being used. For example, over a first duration, a memory system may be requested to access a sequence of random addresses (e.g., logical or physical) that are not related adjacent to one another. In such examples, it may be more efficient to refrain from checking an address to determine whether it is sequential with a preceding address. During this period, the memory system may generate entries according to the second operating mode. In other examples, over a second duration, the memory system may cease random access operations, and may be requested to access a sequence of sequentially-indexed addresses (e.g., logical or physical) that are adjacent to one another. In such examples, it may be more efficient for the memory system to check an address to determine whether it is sequential with a preceding address and then compress entries in the change log. Thus triggering a switch back to the first operating mode. The change log 200 may therefore include multiple non-compressed entries and multiple compressed entries between the illustrated entry pair 220 and the compressed entry 230. The illustrated types of entries of the change log 200 (e.g., the entry 210, the entry pair 220, the compressed entry 230) may, in some cases, occur in any order, depending on the order of access commands received at the memory system. By switching between the first and second mode and selectively compressing information at an entry (e.g., if a received command is associated with an address that is sequential to the one preceding it) the memory system may increase the total amount of information stored at the change log 200 and may thus reduce the number of transfers with the non-volatile memory (e.g., NAND) used to keep the PPT up-to-date.

In some examples, the entries of the change log 200 may include a flag 205, which may indicate whether an entry may be compressed entry (e.g., may be part of a sequential entry pair or a series of sequential entries). For example, in the change log 200, the column of flags 205-*a* may indicate whether the associated physical address (e.g., of the column of PPAs 225-*a*) may be sequentially-indexed with the following physical address (e.g., of the column of PPAs 225-*b*). The flag 205 may be used by the memory system to determine how the information in the entry or in the entry pair should be interpreted at a read operation or when transferring the information to the PPT. Similarly, the column of flags 205-*b* may indicate whether the associated physical address of the column of PPAs 225-*b* may be sequentially-indexed with the preceding physical address (e.g., the associated physical address of the column of PPAs 225-*a*). The flags 205 may be a single bit of information (e.g., a 1 or a 0) to indicate a sequential or non-sequential address. For example, the entry 210 may include a 0 in the flag 205-*a* column, thus indicating that the physical address PPA 1 (e.g., the associated physical address in the PPA 225-*a* column) may not be sequentially-indexed with a following physical address.

In another example, the entry pair 220 may include two successive entries of the change log 200. For example, a first entry of the entry pair 220 may include a flag 205-*a*, a logical address 215-*a*, and a physical address 225-*a*. A second entry of the entry pair 220 may include a flag 205-*b*, a logical address 215-*b*, and a physical address 225-*b*. Both the flag 205-*a* and the flag 205-*b* may be a 1, thus indicating that the associated physical addresses 225-*a* and 225-*b* may be sequentially-indexed (e.g., making up a sequential entry pair).

In another example, the compressed entry 230 may include a 1 in both of the columns of flags 205-*a* and 205-*b*, which may indicate that the addresses between a first physical address (e.g., a physical address 225-*a*) and a second physical address (e.g., a physical address 225-*b*) are sequentially-indexed. For example, the physical address PPA i (e.g., the physical address associated with the column of PPAs 225-*a*) may be sequentially-indexed with a sequence of m physical addresses. Thus, the compressed entry 230 may include information regarding a number (e.g., m) of physical addresses in a compressed format.

In some examples, the memory system may transfer information from the change log 200 to the PPT if the allocated portion of SRAM (e.g., an SRAM buffer) is filled. In some examples, the memory system may transfer information from the change log 200 to the PPT in NAND based on a command from the host. By compressing entries of the change log 200, the memory system may record more information between updates to the PPT in NAND, thus reducing the number of transfers.

Figure 2B:
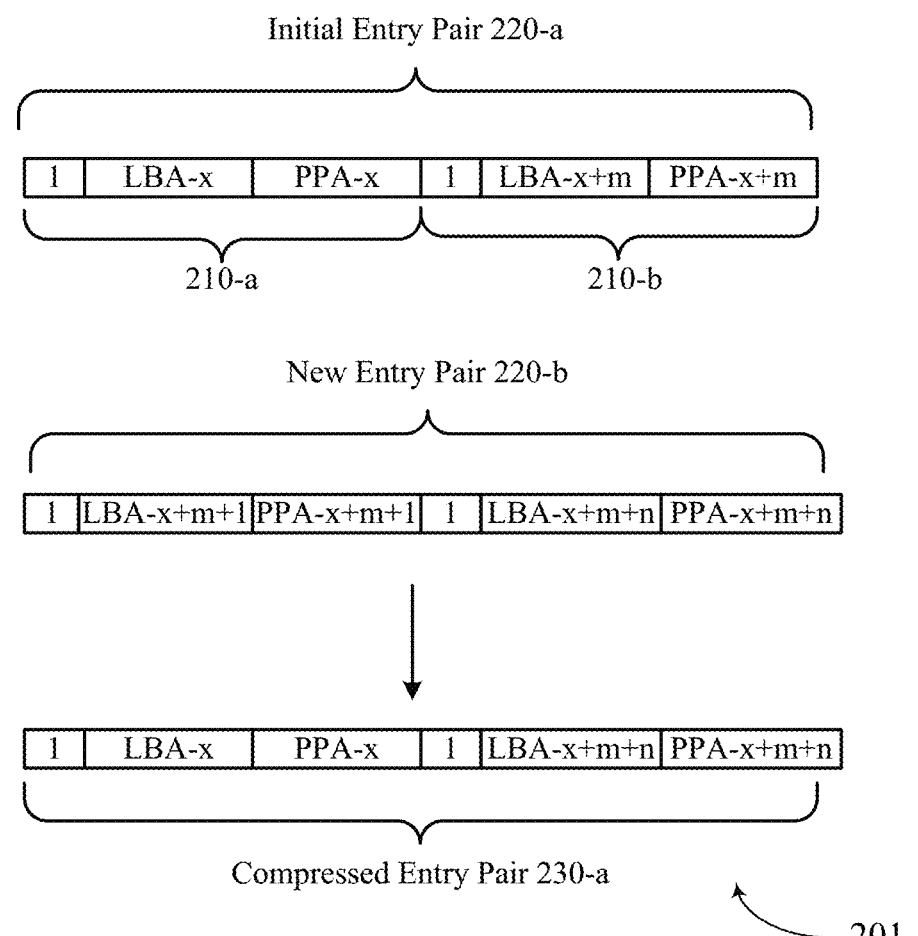
FIG. 2B illustrates an example of a change log compression scheme that supports flexible information compression at a memory system in accordance with examples as disclosed herein.

FIG. 2B illustrates a change log compression scheme 201 that supports flexible information compression at a memory system in accordance with examples as disclosed herein. The change log compression scheme 201 may be an example of aspects of a memory system as described with reference to FIG. 1. The change log compression scheme 201 may include entry pairs, which may be examples of entry pairs and compressed entry pairs of a change log, as described with reference to FIG. 2A. For example, the change log compression scheme 201 may include an initial entry pair 220-*a* and a new entry pair 220-*b*, which may be examples of an entry pair 220 as described with reference to FIG. 2A. The change log compression scheme 201 may also include a compressed entry pair 230-*a*, which may be an example of a compressed entry pair 230 as described with reference to FIG. 2A. In some examples, the compressed entry pair 230-*a* may be the result of compressing the initial entry pair 220-*a* and the new entry pair 220-*b*.

The change log compression scheme 201 may include an initial entry pair 220-*a*. In some examples, the initial entry pair 220-*a* may consist of two individual entries 210-*a* and 210-*b*, which may be examples of entries 210 of a change log as described with reference to FIG. 2A. Each entry may be associated with an access command received at the memory system. For example, the entry 210-*a* may be associated with a first command for the memory system to access a first physical address (e.g., the PPA x). At the time when the entry 210-*a* was generated (e.g., before receiving a second access command) the flag associated with the entry may have been a "1" (as pictured) or a "0". In some examples, at a later time, the memory system may receive the second access command, which may be associated with a second physical address (e.g., the PPA x+m). In some examples, the second physical address may be sequentially-indexed with the first physical address. In some examples, the flag associated with the second entry 210-*b* may be a "1" to indicate that the first and second physical addresses are sequentially-indexed. In some examples, after generating the second entry 210-*b*, the memory system may update the entry 210-*a* to have a "1" flag (e.g., in cases where the entry 210-*a* initially had a "0" flag) such that both the entry 210-*a* and the entry 210-*b* indicate that their associated physical addresses may be sequentially-indexed. In examples where both flags of a pair of entries indicate that they are sequentially-indexed, those entries may be considered a sequential entry pair of the change log. An entry pair may provide some compression of information (e.g., over a single entry) and may be continually updated as the memory system receives more commands associated with sequentially-indexed addresses, thus enabling further compression.

For example, the initial entry pair 220-*a* may be further compressed in response to the memory system receiving a second pair of commands associated with accessing the physical addresses PPA-x+m+1 and PPA-x+m+n, respectively. In some examples, the memory system may associate the second pair of commands with a new entry pair 220-*b* of the change log. In some examples, upon identifying that the new entry pair 220-*b* may be sequentially-indexed with the initial entry pair 220-*a*, the memory system may update the initial entry pair 220-*a* in the change log to include the information associated with the new entry pair 220-*b*, thus generating the compressed entry pair 230-*a*. For example, the compressed entry pair 230-*a* may include a first entry that includes a "1" flag, a logical address (e.g., LBA-x), and a physical address (e.g., PPA-x), and a second entry that includes a "1" flag, a logical address (e.g., LBA-x+m+n), and a physical address (e.g., PPA-x+m+n). The combination of the "1" flags and the respective addresses listed as part of the compressed entry pair 230-*a* may thus indicate that the physical addresses between PPA-x and PPA-x+m+n are sequentially indexed.

In some examples, rather than listing the new entry pair 220-*b* as a separate entry of the change log, the memory system may include the information contained in the initial entry pair 220-*a* and the new entry pair 220-*b* in the single compressed entry pair 230-*a*. By using the change log compression scheme 201, the memory system may characterize a string of sequential access commands in the space of two entries in the change log (e.g., as in the case of the compressed entry pair 230-*a*). The compressed entry pair 230-*a* may therefore use fewer bytes to indicate a sequential range of the L2P mapping in the change log. The memory system may continually update entries of the change log according to the change log compression scheme 201 to selectively compress information at the change log. As the memory system continues to add information to a compressed entry pair (e.g., the compressed entry pair 230-*a*), the first entry of the entry pair may include the starting address for a list of sequentially-indexed addresses, and the second entry of the entry pair may include the ending address for the string of sequentially-indexed addresses. The change log compression scheme 201 may enable the memory system to reduce the number of transfers to the PPT in NAND memory, thus improving many performance characteristics at the memory system, including sequential write performance.

Figure 3:
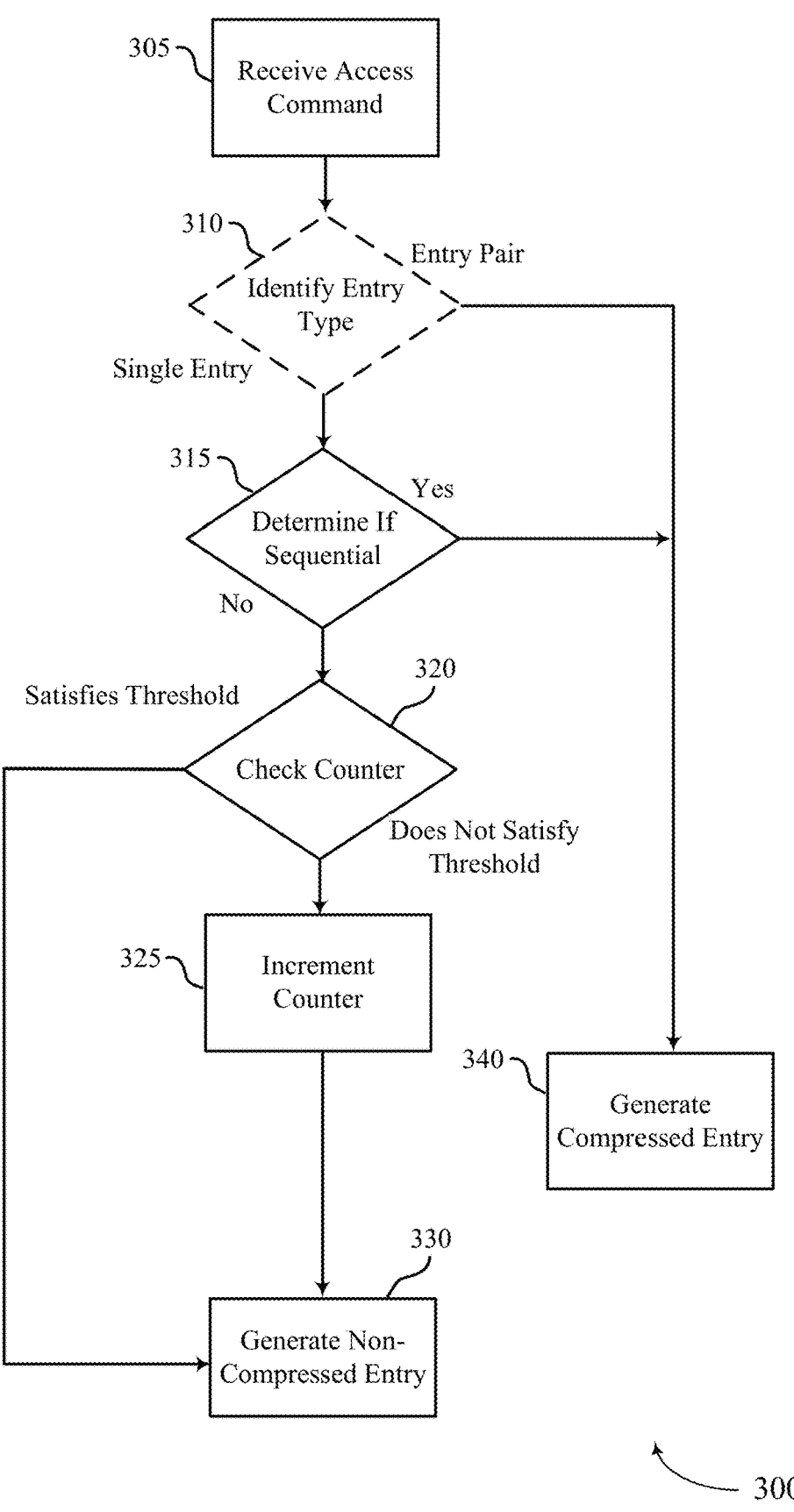
FIG. 3 illustrates an example of a process flow that supports flexible information compression at a memory system in accordance with examples as disclosed herein.

FIG. 3 illustrates an example of a process flow 300 that supports flexible information compression at a memory system in accordance with examples as disclosed herein. Process flow 300 may be implemented by a memory system, which may represent a memory system described with respect to FIGS. 1-2B. Process flow 300 may be implemented by the memory system, for example, to generate entries of a change log that provide a mapping between logical and physical addresses of the memory system, and update entries of the change log as additional access commands are received. Alternative examples of the following may be implemented, where some steps are performed in a different order or not at all. Additionally, some steps may include additional features not mentioned below, some steps may be performed by different components or systems, or any combination thereof.

Aspects of the process flow 300 may be implemented by a memory system, a memory device, a controller, among other components. Additionally or alternatively, aspects of the process flow 300 may be implemented as instructions in stored memory (e.g., firmware stored in a memory coupled with the memory system. For example, the instructions, if executed by a controller (e.g., the memory system controller 115) may cause the controller to perform the operations of process flow 300.

At 305, the memory system may receive an access command, such as a read command or a write command. For example, the memory system may receive an access command from a host device. In some examples, a command from a host device may refer to a logical address, which may have a corresponding physical address, as described with reference to FIGS. 2A and 2B.

In some examples, at 310, the memory system may identify an entry type associated with the access command. For example, in some cases, the memory system may receive two commands, which may include information to be added to the change log. In some examples, the memory system may determine that the two commands may be associated with a sequentially-indexed entry pair. For example, the two commands may include sequentially-indexed logical addresses, which may correspond to adjacent portions of physical memory. In such examples, the memory system may proceed to 340. In some examples, the memory system may receive a single command, which may be associated with a single entry at the change log, and may proceed to 315. The memory system may perform the check to identify if a command is associated with an entry pair or a single entry in response to the memory system operating in a first mode associated with generating compressed entries at the change log. The first mode may be the default mode of operating at the memory system.

At 340, the memory system may compress the entries associated with the two commands to generate a compressed entry pair at the change log. For example, as part of the compression, the memory system may update a flag associated with the entry pair. In some examples, satisfying the condition at 310 to proceed to 340 (e.g., identifying a sequential entry pair) may trigger the memory system to continue operating in the first mode (e.g., a mode associated with identifying sequentially-indexed addresses and generating compressed entries). Generating a compress entry may include various functions. If a new pair of sequential addresses is identified, the memory system may generate the entry for the ending address that includes the sequential flag and may modify the entry (already generated) for the starting address to include the sequential flag. If an additional entry in a string of sequentially-indexed addresses is identified, the memory system may modify the entry for the ending address to include the new logical address and the new physical address.

At 315, the memory system may determine if the single entry is sequential with a previous entry. The function of checking if the entry is sequential is related to being in the first mode associated with identifying sequentially-indexed addresses. If the memory system is operation in the second mode associated with not identifying sequentially-indexed addresses, the memory system may be looking for an entry pair (such as at 310) to enter the first mode. If the memory system is operating in the first mode, it may skip 310 and perform the functions of 315. At 315, the memory system may check if an address (e.g., a logical or physical address) included in the single entry is sequentially-indexed with an address of a previous entry in the change log. In some examples, if the memory system determines that the single command is associated with a sequential address, the memory system may proceed to 340 and continue to operate in the first mode. In some examples, if the memory system determines that the single command is not associated with a sequential address, the memory system may proceed to 320. At 340, the memory system may use the information included in the single command to generate a compressed entry. For example, the memory system may update a previous entry of the change log with the new information included in the single command. In some examples, the memory system may update a flag at the compressed entry to indicate that it is part of a compressed entry pair.

At 320, the memory system may check a counter to determine if the current value satisfies a threshold. For example, the counter may be associated with a number of non-sequentially-indexed entries of the change log (e.g., non-compressed entries). In some examples, the threshold value may be programmable by a host device or other type of device. For example, the threshold value may be determined based on a capacity of SRAM at the memory system, an expected ratio of random access commands to sequential commands, or another factor. In some examples, if the counter satisfies the threshold value, the memory system may proceed to 330. In some examples, if the counter does not satisfy the threshold value, the memory system may proceed to 325. One purpose of the counter is to determine whether the memory system is operating in a random access type situation. If the quantity of non-sequential addresses accessed exceeds the threshold, the memory system may shift to the second mode where sequentiality of addresses may be not determined.

At 325, the memory system may increment the counter. In some examples, incrementing the counter may be associated with adding a non-compressed entry to the change log. If the memory system proceeds to 325 (e.g., if the counter has not yet satisfied the threshold), the memory system may continue to operate in the first mode. That is, if future commands may be received, the memory system may continue to check for sequential pairs of entries to attempt to generate compressed entries of the change log.

At 330, the memory system may generate a non-compressed entry of the change log. For example, a non-compressed entry may include information (e.g., a logical address and a corresponding physical address) associated with a single command. The addresses included in the non-compressed entry may not be sequentially-indexed with previous entries of the change log. In some examples, as part of generating the non-compressed entry, the memory system may assign a "0" value to the flag to indicate that the entry is non-sequential. In some examples, in response to the memory system proceeding from 325 to 330, the memory system may be operating in the first mode. For example, even though the memory system may generate a non-compressed entry at 330 based on receiving a non-sequential command, the memory system may continue to check for sequential entries to compress in response to receiving future commands (e.g., at future iterations of the process flow 300).

In some examples, in response to the memory system proceeding from 320 to 330, the memory system may be operating in the second mode or may switch from operating in the first mode to operating in the second mode. For example, the second mode may be associated with generating entries (e.g., non-compressed entries) of the change log for each address received in commands, and may reduce latency. In some examples, the memory system may be configured to switch to operating in the second mode after generating a threshold number of non-compressed entries of the change log. In some examples, the memory system may go through periods of performing primarily random access operations, which may be associated with non-sequential entries at the change log. During such periods (e.g., as indicated by satisfying the threshold of non-sequentially-indexed entries), the memory system may be configured to operate in the second mode.

In some examples, the memory system may execute the steps of the process flow 300 for each command or pair of commands received from a host device. In some examples, while operating in the second mode, the memory system may determine (e.g., at 315) that it has received a command associated with a sequentially-indexed address, and may switch back to operating in the first mode (e.g., by proceeding to 340). By switching between the two operating modes, the memory system may selectively compress entries of the change log and reduce the number of updates of the PPT.

Figure 4:
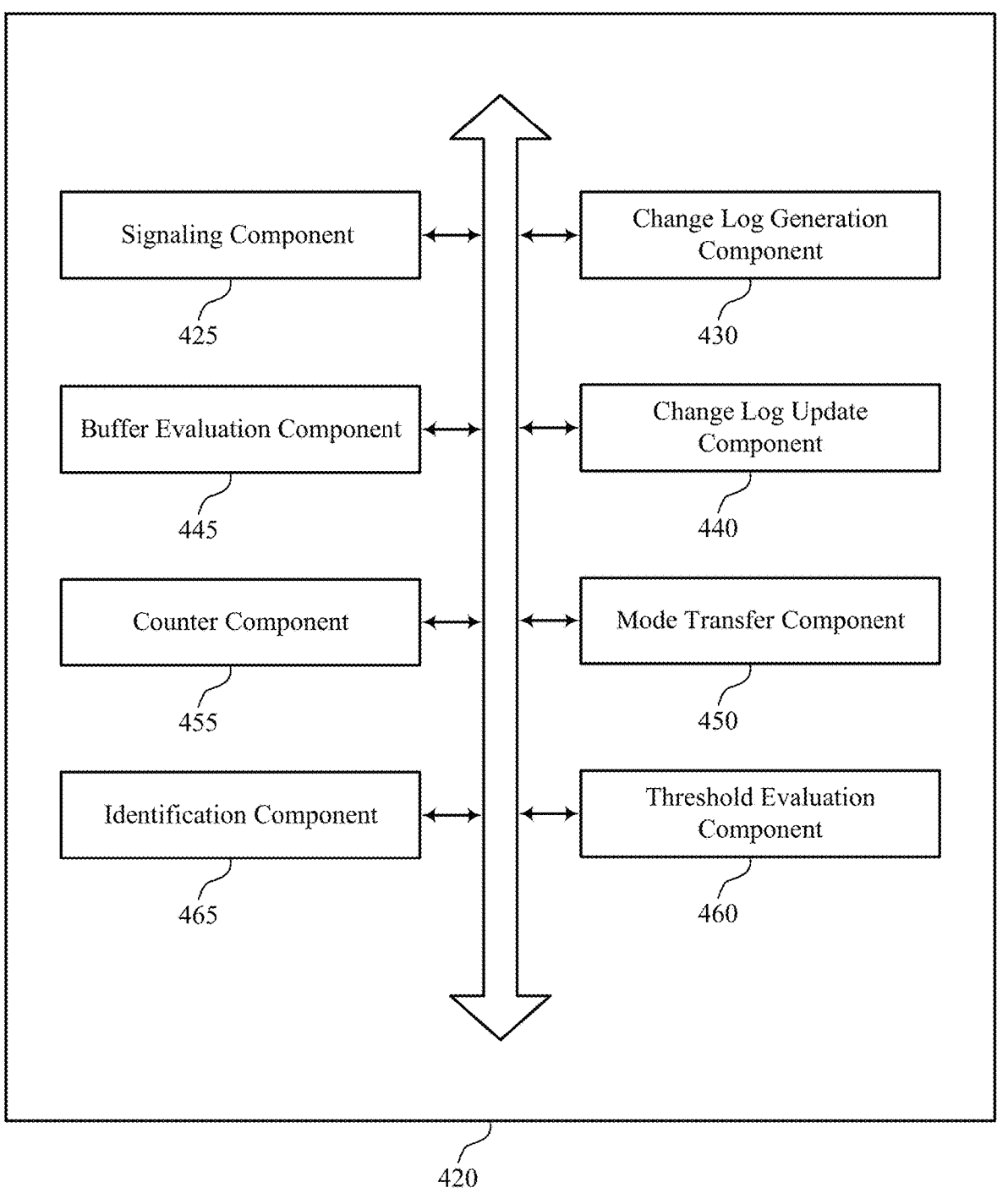
FIG. 4 shows a block diagram of a memory system that supports flexible information compression at a memory system in accordance with examples as disclosed herein.

FIG. 4 shows a block diagram 400 of a memory system 420 that supports flexible information compression at a memory system in accordance with examples as disclosed herein. The memory system 420 may be an example of aspects of a memory system as described with reference to FIGS. 1 through 3. The memory system 420, or various components thereof, may be an example of means for performing various aspects of flexible information compression at a memory system as described herein. For example, the memory system 420 may include a signaling component

425, a change log generation component 430, a change log update component 440, a buffer evaluation component 445, a mode transfer component 450, a counter component 455, a threshold evaluation component 460, an identification component 465, or any combination thereof. Each of these components may communicate, directly or indirectly, with one another (e.g., via one or more buses).

The signaling component 425 may be configured as or otherwise support a means for receiving a first command for accessing a first logical address associated with a memory system. The change log generation component 430 may be configured as or otherwise support a means for generating a first entry of a change log with first information associated with the first command, the change log associated with a mapping between logical addresses and physical addresses of the memory system. The signaling component 425 may be configured as or otherwise support a means for receiving a second command for accessing a second logical address associated with the memory system, where the second logical address is sequentially indexed with the first logical address associated with the first command. The change log update component 440 may be configured as or otherwise support a means for updating the first entry of the change log with a first flag indicating that the first logical address is sequentially indexed with the second logical address. In some examples, the change log generation component 430 may be configured as or otherwise support a means for generating a second entry of the change log with second information associated with the second command, the second entry including a second flag indicating that the second logical address is sequentially indexed with the first logical address.

In some examples, the memory system may receive a third command for accessing a third logical address associated with the memory system, where the third logical address is sequentially indexed with the first logical address and the second logical address. In some examples, update the second entry of the change log with third information associated with the third command, the second entry including the second flag indicating that the third logical address is sequentially indexed with the first logical address and the second logical address.

In some examples, the memory system may receive a third command for accessing a third logical address associated with the memory system, where the third logical address is non-sequentially indexed with the first logical address and the second logical address. In some examples, the memory system may generate a third entry of the change log with third information associated with the third command, the third entry including a third flag indicating that the third logical address is non-sequentially indexed with the second logical address.

In some examples, the memory system may increment a counter associated with identifying sequentially indexed addresses based at least in part on the third logical address being non-sequentially indexed with the first logical address and the second logical address.

In some examples, the memory system may determine that a value of the counter satisfies a threshold. In some examples, the memory system may transfer from operating in a first mode to operating in a second mode based at least in part on the value of the counter satisfying the threshold, the first mode associated with identifying sequentially-indexed addresses and generating compressed entries in the change log, and the second mode associated with generating entries of the change log for each address received in commands.

In some examples, the memory system may receive a fourth command for accessing a fourth logical address associated with the memory system. In some examples, the memory system may generate, while operating in the second mode, a fourth entry of the change log with fourth information associated with the fourth command. In some examples, the memory system may receive a fifth command for accessing a fifth logical address associated with the memory system, where the fifth logical address is sequentially indexed with the fourth logical address. In some examples, the memory system may transfer from operating in the second mode to operating in the first mode based at least in part on the fifth logical address being sequentially indexed with the fourth logical address. In some examples, the memory system may update the fourth entry of the change log with a fourth flag indicating that the fourth logical address is sequentially indexed with the fifth logical address. In some examples, the memory system may generate a fifth entry of the change log with fifth information associated with the fifth command, the fifth entry including a fifth flag indicating that the fifth logical address is sequentially indexed with the fourth logical address.

In some examples, the memory system may identify a pair of commands that include sequentially-indexed logical addresses. In some examples, the memory system may transfer from operating in the second mode to operating in the first mode based at least in part on the identifying.

In some examples, each entry of the change log includes a logical block address and a physical block address, each associated with a same command for accessing the memory system.

In some examples, the memory system may determine that a buffer associated with the change log is full. In some examples, the memory system may transfer, based at least in part on determining that the buffer is full, the first information and the second information in the change log from a first type of memory device to a second type of memory device at the memory system.

In some examples, the signaling component 425 may be configured as or otherwise support a means for receiving a first command for accessing a first logical address associated with a memory system. In some examples, the change log generation component 430 may be configured as or otherwise support a means for generating a first entry of a change log with first information associated with the first command, the change log associated with a mapping between logical addresses and physical addresses of the memory system. In some examples, the signaling component 425 may be configured as or otherwise support a means for receiving a second command for accessing a second logical address associated with the memory system, where the second logical address is sequentially indexed with the first logical address associated with the first command. In some examples, the change log update component 440 may be configured as or otherwise support a means for updating the first entry of the change log with a first flag indicating that the first logical address is sequentially indexed with the second logical address. In some examples, the change log generation component 430 may be configured as or otherwise support a means for generating a second entry of the change log with second information associated with the second command, the second entry including a second flag indicating that the second logical address is sequentially indexed with the first logical address.

In some examples, the signaling component 425 may be configured as or otherwise support a means for receiving a third command for accessing a third logical address associated with the memory system, where the third logical address is sequentially indexed with the first logical address and the second logical address. In some examples, the change log update component 440 may be configured as or otherwise support a means for updating the second entry of the change log with third information associated with the third command, the second entry including the second flag indicating that the third logical address is sequentially indexed with the first logical address and the second logical address.

In some examples, the signaling component 425 may be configured as or otherwise support a means for receiving a third command for accessing a third logical address associated with the memory system, where the third logical address is non-sequentially indexed with the first logical address and the second logical address. In some examples, the change log generation component 430 may be configured as or otherwise support a means for generating a third entry of the change log with third information associated with the third command, the third entry including a third flag indicating that the third logical address is non-sequentially indexed with the second logical address.

In some examples, the counter component 455 may be configured as or otherwise support a means for incrementing a counter associated with identifying sequentially indexed addresses based at least in part on the third logical address being non-sequentially indexed with the first logical address and the second logical address.

In some examples, the threshold evaluation component 460 may be configured as or otherwise support a means for determining that a value of the counter satisfies a threshold. In some examples, the mode transfer component 450 may be configured as or otherwise support a means for transferring the memory system from operating in a first mode to operating in a second mode based at least in part on the value of the counter satisfying the threshold, the first mode associated with identifying sequentially-indexed addresses and generating compressed entries in the change log, and the second mode associated with generating entries of the change log for each address received in commands.

In some examples, the signaling component 425 may be configured as or otherwise support a means for receiving a fourth command for accessing a fourth logical address associated with the memory system. In some examples, the change log generation component 430 may be configured as or otherwise support a means for generating, while operating in the second mode, a fourth entry of the change log with fourth information associated with the fourth command. In some examples, the signaling component 425 may be configured as or otherwise support a means for receiving a fifth command for accessing a fifth logical address associated with the memory system, where the fifth logical address is sequentially indexed with the fourth logical address. In some examples, the mode transfer component 450 may be configured as or otherwise support a means for transferring the memory system from operating in the second mode to operating in the first mode based at least in part on the fifth logical address being sequentially indexed with the fourth logical address. In some examples, the change log update component 440 may be configured as or otherwise support a means for updating the fourth entry of the change log with a fourth flag indicating that the fourth logical address is sequentially indexed with the fifth logical address. In some examples, the change log generation component 430 may be configured as or otherwise support a means for generating a fifth entry of the change log with fifth information associated with the fifth command, the fifth entry including a fifth flag indicating that the fifth logical address is sequentially indexed with the fourth logical address.

In some examples, the identification component 465 may be configured as or otherwise support a means for identifying a pair of commands that include sequentially-indexed logical addresses. In some examples, the mode transfer component 450 may be configured as or otherwise support a means for transferring the memory system from operating in the second mode to operating in the first mode based at least in part on the identifying.

FIG. 5 shows a flowchart illustrating a method 500 that supports flexible information compression at a memory system in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include receiving a first command for accessing a first logical address associated with a memory system. The operations of 505 may be performed in accordance with examples as disclosed herein. In some examples, aspects of the operations of 505 may be performed by a signaling component 425 as described with reference to FIG. 4.

At 510, the method may include generating a first entry of a change log with first information associated with the first command, the change log associated with a mapping between logical addresses and physical addresses of the memory system. The operations of 510 may be performed in accordance with examples as disclosed herein. In some examples, aspects of the operations of 510 may be performed by a change log generation component 430 as described with reference to FIG. 4.

At 515, the method may include receiving a second command for accessing a second logical address associated with the memory system, where the second logical address is sequentially indexed with the first logical address associated with the first command. The operations of 515 may be performed in accordance with examples as disclosed herein. In some examples, aspects of the operations of 515 may be performed by a signaling component 425 as described with reference to FIG. 4.

At 520, the method may include updating the first entry of the change log with a first flag indicating that the first logical address is sequentially indexed with the second logical address. The operations of 520 may be performed in accordance with examples as disclosed herein. In some examples, aspects of the operations of 520 may be performed by a change log update component 440 as described with reference to FIG. 4.

At 525, the method may include generating a second entry of the change log with second information associated with the second command, the second entry including a second flag indicating that the second logical address is sequentially indexed with the first logical address. The operations of 525 may be performed in accordance with examples as disclosed herein. In some examples, aspects of the operations of 525 may be performed by a change log generation component 430 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for receiving a first command for accessing a first logical address associated with a memory system; generating a first entry of a change log with first information associated with the first command, the change log associated with a mapping between logical addresses and physical addresses of the memory system; receiving a second command for accessing a second logical address associated with the memory system, where the second logical address is sequentially indexed with the first logical address associated with the first command; updating the first entry of the change log with a first flag indicating that the first logical address is sequentially indexed with the second logical address; and generating a second entry of the change log with second information associated with the second command, the second entry including a second flag indicating that the second logical address is sequentially indexed with the first logical address.

Aspect 2: The apparatus of aspect 1, further including operations, features, circuitry, logic, means, or instructions, or any combination thereof for receiving a third command for accessing a third logical address associated with the memory system, where the third logical address is sequentially indexed with the first logical address and the second logical address and updating the second entry of the change log with third information associated with the third command, the second entry including the second flag indicating that the third logical address is sequentially indexed with the first logical address and the second logical address.

Aspect 3: The apparatus of any of aspects 1 through 2, further including operations, features, circuitry, logic, means, or instructions, or any combination thereof for receiving a third command for accessing a third logical address associated with the memory system, where the third logical address is non-sequentially indexed with the first logical address and the second logical address and generating a third entry of the change log with third information associated with the third command, the third entry including a third flag indicating that the third logical address is non-sequentially indexed with the second logical address.

Aspect 4: The apparatus of aspect 3, further including operations, features, circuitry, logic, means, or instructions, or any combination thereof for incrementing a counter associated with identifying sequentially indexed addresses based at least in part on the third logical address being non-sequentially indexed with the first logical address and the second logical address.

Aspect 5: The apparatus of aspect 4, further including operations, features, circuitry, logic, means, or instructions, or any combination thereof for determining that a value of the counter satisfies a threshold and transferring the memory system from operating in a first mode to operating in a second mode based at least in part on the value of the counter satisfying the threshold, the first mode associated with identifying sequentially-indexed addresses and generating compressed entries in the change log, and the second mode associated with generating entries of the change log for each address received in commands.

Aspect 6: The apparatus of aspect 5, further including operations, features, circuitry, logic, means, or instructions, or any combination thereof for receiving a fourth command for accessing a fourth logical address associated with the memory system; generating, while operating in the second mode, a fourth entry of the change log with fourth information associated with the fourth command; receiving a fifth command for accessing a fifth logical address associated with the memory system, where the fifth logical address is sequentially indexed with the fourth logical address; transferring the memory system from operating in the second mode to operating in the first mode based at least in part on the fifth logical address being sequentially indexed with the fourth logical address; updating the fourth entry of the change log with a fourth flag indicating that the fourth logical address is sequentially indexed with the fifth logical address; and generating a fifth entry of the change log with fifth information associated with the fifth command, the fifth entry including a fifth flag indicating that the fifth logical address is sequentially indexed with the fourth logical address.

Aspect 7: The apparatus of any of aspects 5 through 6, further including operations, features, circuitry, logic, means, or instructions, or any combination thereof for identifying a pair of commands that include sequentially-indexed logical addresses and transferring the memory system from operating in the second mode to operating in the first mode based at least in part on the identifying.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 8: An apparatus, including: a memory system; and a controller coupled with the memory system and configured to cause the apparatus to: receive a first command for accessing a first logical address associated with the memory system; generate a first entry of a change log with first information associated with the first command, the change log associated with a mapping between logical addresses and physical addresses of the memory system; receive a second command for accessing a second logical address associated with the memory system, the second logical address sequentially indexed with the first logical address associated with the first command; update the first entry of the change log with a first flag indicating that the first logical address is sequentially indexed with the second logical address; and generate a second entry of the change log with second information associated with the second command, the second entry including a second flag indicating that the second logical address is sequentially indexed with the first logical address.

Aspect 9: The apparatus of aspect 8, where the controller is further configured to cause the apparatus to: receive a third command for accessing a third logical address associated with the memory system, where the third logical address is sequentially indexed with the first logical address and the second logical address; and update the second entry of the change log with third information associated with the third command, the second entry including the second flag indicating that the third logical address is sequentially indexed with the first logical address and the second logical address.

Aspect 10: The apparatus of any of aspects 8 through 9, where the controller is further configured to cause the apparatus to: receive a third command for accessing a third logical address associated with the memory system, where the third logical address is non-sequentially indexed with the first logical address and the second logical address; and generate a third entry of the change log with third information associated with the third command, the third entry including a third flag indicating that the third logical address is non-sequentially indexed with the second logical address.

Aspect 11: The apparatus of aspect 10, where the controller is further configured to cause the apparatus to: increment a counter associated with identifying sequentially indexed addresses based at least in part on the third logical address being non-sequentially indexed with the first logical address and the second logical address.

Aspect 12: The apparatus of aspect 11, where the controller is further configured to cause the apparatus to: determine that a value of the counter satisfies a threshold; and transfer the memory system from operating in a first mode to operating in a second mode based at least in part on the value of the counter satisfying the threshold, the first mode associated with identifying sequentially-indexed addresses and generating compressed entries in the change log, and the second mode associated with generating entries of the change log for each address received in commands.

Aspect 13: The apparatus of aspect 12, where the controller is further configured to cause the apparatus to: receive a fourth command for accessing a fourth logical address associated with the memory system; generate, while operating in the second mode, a fourth entry of the change log with fourth information associated with the fourth command; receive a fifth command for accessing a fifth logical address associated with the memory system, where the fifth logical address is sequentially indexed with the fourth logical address; transfer the memory system from operating in the second mode to operating in the first mode based at least in part on the fifth logical address being sequentially indexed with the fourth logical address; update the fourth entry of the change log with a fourth flag indicating that the fourth logical address is sequentially indexed with the fifth logical address; and generate a fifth entry of the change log with fifth information associated with the fifth command, the fifth entry including a fifth flag indicating that the fifth logical address is sequentially indexed with the fourth logical address.

Aspect 14: The apparatus of any of aspects 12 through 13, where the controller is further configured to cause the apparatus to: identify a pair of commands that include sequentially-indexed logical addresses; and transfer the memory system from operating in the second mode to operating in the first mode based at least in part on the identifying.

Aspect 15: The apparatus of any of aspects 8 through 14, where each entry of the change log includes a logical block address and a physical block address, each associated with a same command for accessing the memory system.

Aspect 16: The apparatus of any of aspects 8 through 15, where the controller is further configured to cause the apparatus to: determine that a buffer associated with the change log is full; and transfer, based at least in part on determining that the buffer is full, the first information and the second information in the change log from a first type of memory device to a second type of memory device at the memory system.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
generate, in response to a first command, a first entry of a change log with first information associated with a first logical address corresponding to the first command, the change log associated with a mapping between logical addresses and physical addresses of the memory system;
receive a second command for accessing a second logical address associated with the memory system, the second logical address sequentially indexed with the first logical address;
update, in accordance with a first mode of operation and the second logical address being sequentially indexed with the first logical address, the first entry of the change log with a first flag indicating that the first logical address is sequentially indexed with the second logical address, wherein the first mode of operation is associated with identifying sequentially-indexed addresses and generating compressed entries in the change log; and
generate, in accordance with the first mode of operation, a second entry of the change log with second information associated with the second command, the second entry comprising a second flag indicating that the second logical address is sequentially indexed with the first logical address, wherein the second flag is separate from the first flag.

2. The memory system of claim 1, wherein the processing circuitry is further configured to cause the memory system to:
determine that the second logical address is sequentially indexed with the first logical address; and
transfer to the first mode of operation in response to the determination that the second logical address is sequentially indexed with the first logical address.

3. The memory system of claim 1, wherein the processing circuitry is further configured to cause the memory system to:

transfer to a second mode of operation associated with generating entries of the change log for each address received in commands.

4. The memory system of claim 3, wherein the processing circuitry is further configured to cause the memory system to:

receive a third command for accessing a third logical address associated with the memory system; and generate, in accordance with the second mode of operation, a third entry of the change log with third information associated with the third command.

5. The memory system of claim 3, wherein the processing circuitry is further configured to cause the memory system to:

transfer to the second mode of operation in response to receiving a quantity of access commands including non-sequentially indexed addresses that exceeds a threshold value.

6. The memory system of claim 3, wherein the processing circuitry is further configured to cause the memory system to:

transfer to the second mode of operation in response to receiving one or more commands associated with accessing a sequence of random addresses.

7. The memory system of claim 3, wherein the processing circuitry is further configured to cause the memory system to:

receive a third command for accessing a third logical address associated with the memory system, wherein the third logical address is non-sequentially indexed with the first logical address and the second logical address; and increment a counter associated with identifying non-sequentially indexed addresses in response to the third logical address being non-sequentially indexed with the first logical address and the second logical address, wherein transferring to the second mode of operations is in response to the counter exceeding a threshold value.

8. A non-transitory computer-readable medium storing code comprising instructions which, when executed by processing circuitry of a memory system, cause the memory system to:

generate, in response to a first command, a first entry of a change log with first information associated with a first logical address corresponding to the first command, the change log associated with a mapping between logical addresses and physical addresses of the memory system;

receive a second command for accessing a second logical address associated with the memory system, the second logical address sequentially indexed with the first logical address;

update, in accordance with a first mode of operation and the second logical address being sequentially indexed with the first logical address, the first entry of the change log with a first flag indicating that the first logical address is sequentially indexed with the second logical address, wherein the first mode of operation is associated with identifying sequentially-indexed addresses and generating compressed entries in the change log; and generate, in accordance with the first mode of operation, a second entry of the change log with second information associated with the second command, the second entry comprising a second flag indicating that the second logical address is sequentially indexed with the first logical address, wherein the second flag is separate from the first flag.

9. The non-transitory computer-readable medium of claim 8, wherein the instructions, when executed by the processing circuitry of the memory system, further cause the memory system to:

determine that the second logical address is sequentially indexed with the first logical address; and transfer to the first mode of operation in response to the determination that the second logical address is sequentially indexed with the first logical address.

10. The non-transitory computer-readable medium of claim 8, wherein the instructions, when executed by the processing circuitry of the memory system, further cause the memory system to:

transfer to a second mode of operation associated with generating entries of the change log for each address received in commands.

11. The non-transitory computer-readable medium of claim 10, wherein the instructions, when executed by the processing circuitry of the memory system, further cause the memory system to:

receive a third command for accessing a third logical address associated with the memory system; and generate, in accordance with the second mode of operation, a third entry of the change log with third information associated with the third command.

12. The non-transitory computer-readable medium of claim 10, wherein the instructions, when executed by the processing circuitry of the memory system, further cause the memory system to:

transfer to the second mode of operation in response to receiving a quantity of access commands including non-sequentially indexed addresses that exceeds a threshold value.

13. The non-transitory computer-readable medium of claim 10, wherein the instructions, when executed by the processing circuitry of the memory system, further cause the memory system to:

transfer to the second mode of operation in response to receiving one or more commands associated with accessing a sequence of random addresses.

14. The non-transitory computer-readable medium of claim 10, wherein the instructions, when executed by the processing circuitry of the memory system, further cause the memory system to:

receive a third command for accessing a third logical address associated with the memory system, wherein the third logical address is non-sequentially indexed with the first logical address and the second logical address; and increment a counter associated with identifying non-sequentially indexed addresses in response to the third logical address being non-sequentially indexed with the first logical address and the second logical address, wherein transferring to the second mode of operations is in response to the counter exceeding a threshold value.

15. A method at a memory system, comprising:

generating, in response to a first command, a first entry of a change log with first information associated with a first logical address corresponding to the first command, the change log associated with a mapping between logical addresses and physical addresses of the memory system;

receiving a second command for accessing a second logical address associated with the memory system, the second logical address sequentially indexed with the first logical address;

updating, in accordance with a first mode of operation and the second logical address being sequentially indexed with the first logical address, the first entry of the change log with a first flag indicating that the first logical address is sequentially indexed with the second logical address, wherein the first mode of operation is associated with identifying sequentially-indexed addresses and generating compressed entries in the change log; and generating, in accordance with the first mode of operation, a second entry of the change log with second information associated with the second command, the second entry comprising a second flag indicating that the second logical address is sequentially indexed with the first logical address, wherein the second flag is separate from the first flag.

16. The method of claim 15, further comprising:

determining that the second logical address is sequentially indexed with the first logical address; and transferring to the first mode of operation in response to the determination that the second logical address is sequentially indexed with the first logical address.

17. The method of claim 15, further comprising:

transferring to a second mode of operation associated with generating entries of the change log for each address received in commands.

18. The method of claim 17, further comprising:

receiving a third command for accessing a third logical address associated with the memory system; and generating, in accordance with the second mode of operation, a third entry of the change log with third information associated with the third command.

19. The method of claim 17, further comprising:

transferring to the second mode of operation in response to receiving a quantity of access commands including non-sequentially indexed addresses that exceeds a threshold value.

20. The method of claim 17, further comprising:

transferring to the second mode of operation in response to receiving one or more commands associated with accessing a sequence of random addresses.

* * * * *